(12) United States Patent
Monedero Recuero

(10) Patent No.: US 9,374,840 B2
(45) Date of Patent: Jun. 21, 2016

(54) VERIFICATION METHOD FOR THE VERIFICATION OF A CONNECTION REQUEST FROM A ROAMING MOBILE ENTITY

(71) Applicant: Vodafone Holding GmbH, Dusseldorf (DE)

(72) Inventor: Luis Alejandro Monedero Recuero, Arlon (BE)

(73) Assignee: Vodafone Holding GmbH, Dusseldorf (DE)

( * ) Notice: Subject to any disclaimer, the term of this patent is extended or adjusted under 35 U.S.C. 154(b) by 43 days.

(21) Appl. No.: 14/574,632

(22) Filed: Dec. 18, 2014

(65) Prior Publication Data
US 2015/0181627 A1 Jun. 25, 2015

(30) Foreign Application Priority Data
Dec. 19, 2013 (EP) .................................... 13198402

(51) Int. Cl.
| | |
|---|---|
| H04W 8/12 | (2009.01) |
| H04W 76/02 | (2009.01) |
| H04W 92/02 | (2009.01) |
| H04W 8/02 | (2009.01) |
| H04W 12/06 | (2009.01) |
| H04W 92/24 | (2009.01) |
| H04W 88/00 | (2009.01) |

(52) U.S. Cl.
CPC ............... *H04W 76/02* (2013.01); *H04W 8/12* (2013.01); *H04W 92/02* (2013.01); *H04W 8/02* (2013.01); *H04W 12/06* (2013.01); *H04W 88/005* (2013.01); *H04W 92/24* (2013.01)

(58) Field of Classification Search
CPC ............ H04W 8/06; H04W 8/12; H04W 8/14
USPC ................................................ 455/432.1, 433
See application file for complete search history.

(56) References Cited

U.S. PATENT DOCUMENTS

| | | | |
|---|---|---|---|
| 2007/0184832 A1* | 8/2007 | Faccin | H04L 63/1458 455/432.1 |
| 2009/0325575 A1* | 12/2009 | Rantanen | H04W 48/18 455/433 |
| 2013/0171990 A1 | 7/2013 | McCann et al. | |

OTHER PUBLICATIONS

European Search Report and the European Search Opinion Dated Jul. 9, 2014 From the European Patent Office Re. Application No. 13198402.3.

(Continued)

*Primary Examiner* — Christopher M Brandt (57) ABSTRACT

The invention is related to a verification method for the verification of a Connection Request (CR) from a Roaming Mobile Entity (10) requesting connection to a Mobile Network (100). Further, the invention is related to a computer program product being stored on a computer readable medium and to a Mobile Communication Network (100) for communication comprising at least one International Provider Entity (IPE) and multiple local Mobile Management Entities (MME).

14 Claims, 5 Drawing Sheets

(56) References Cited

OTHER PUBLICATIONS

3GPP™ "3rd Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol (Release 12)", 3GPP Standard, 3GPP TS 29.272, XP050728799, CT WG4(V12.3.0): 1-129, Dec. 13, 2013. Para 5.2.1.1.1, 5.2.1.1.2, 5.2.1.1.3, 5.2.3.1.1, 5.2.3.1.2, 5.2.3.1.3, 7.1.1, 7.1.2, Table 7.2.2/1. Para 7.2.5, 7.2.6, Annex A.

3GPP™ "3rd Generation Partnership Project; Technical Specification Group Services and System Aspects; General Packet Radio Service (GPRS) Enhancements for Evolved Universal Terrestrial Radio Access Network (E-UTRAN) Access (Release 12)", 3GPP Standard, 3GPP TS 23.401, XP050712247, SA WG2(V12.2.0): 1-293, Sep. 11, 2013. Para 5.3.2.1, Fig.5.3.2.1-1.

3GPP™ "3rd Generation Partnersip Projects; Technical Specification Group Core Network and Terminals; Non-Access-Stratum (NAS) Protocol for Evolved Packet System (EPS); Stage 3, (Release 12)", 3GPP Standard, 3GPP TS 24.301, XP050712550, CT WG1(V12.2.0): 1-352, Sep. 18, 2013. Para 5.5.1.2.1, 5.5.1.2.2, 5.5.1.2.3. 5.5.1.2.4, 5.5.1.2.5, Fig.5.5.1.2.2.1, Para 8.2.1, 8.2.2, 8.2.3, 8.2.4.

Efort "DIAMETER Singnaling Network in EPS: Principles and Architecture", EFORT, XP055125916, p. 1-6, Mar. 24, 2012.

Eronen et al. "RFC 4072—Diameter Extensible Authentication Protocol (EAP) Application", Network Working Group, The Internet Society, XP015041927, 24 & 32 P., Aug. 2005. Para 1, 2.2, 2.3.2.

GSMA™ "Document IR.88: LTE and EPC Roaming Guidelines (Version 10.0)", GSM Association, XP055125912, p. 1-68, Jul. 10, 2013. Para 2.1, Figs.2.1-1, 3.1.3.3-1, Table 2.2-1, Para 3.1.3.2, 3.1.3.3, 3.1.3.4, 3.1.3.6, 6.1.1, 6.1.2.

* cited by examiner

VERIFICATION METHOD FOR THE VERIFICATION OF A CONNECTION REQUEST FROM A ROAMING MOBILE ENTITY

RELATED APPLICATION

This application claims the benefit of priority of European Patent Application No. 13198402.3 filed on Dec. 19, 2013, the contents of which are incorporated herein by reference in their entirety.

FIELD AND BACKGROUND OF THE INVENTION

The present invention is related to a verification method for the verification of a Connection Request from a roaming mobile entity requesting connection to a Mobile Network, as well as a respective computer program product and a mobile communication network.

It is generally known that mobile entities can travel to different countries. Up after leaving the home network, the mobile entity is a so called roaming mobile entity which has to connect to foreign networks for example roaming networks. In such a situation it has to be assured, that the roaming mobile entity is only allowed to connect to the Mobile Network, if a respective roaming agreement is in place. Such a roaming agreement is for example negotiated between two different network companies, namely the foreign network company and the home network company of the user of the roaming mobile entity.

To ensure that roaming mobile entities are only able to enter a roaming Mobile Network in the case that an agreement between the respective two network companies is in place, commonly known methods carried out a respective check at a so called local Mobile Management Entity (MME). Throughout national Mobile Network, a huge number of Mobile Management Entities is in place to carry out different management functionalities for the Mobile Network. In that local Mobile Management Entities also the approval of the reconnection request of the Roaming Mobile Entity is carried out.

Aforesaid commonly known method for carrying out the verification of the Connection Request has a lot of disadvantages. In particular, it has to be assured that all Mobile Management Entities are able to have the latest information as to agreement situations between multiple network companies. In particular, each Mobile Management Entity has to have a list with all the latest information about agreements between the respective national network and all possible foreign networks which are home networks for the Mobile Entity. A further disadvantage is the high complexity of the testing environment for such a situation. To carry out the testing environment in particular a lot of Mobile Management Entities have to be set up with the respective testing environment. After the test has been carried out in detail, the test environment has to be shifted to the full functionality under working conditions. This test has to be carried out for each new agreement which has been pushed into place by each two different network companies.

SUMMARY OF THE INVENTION

It is an object of the present invention to overcome aforesaid disadvantages. In particular it is an object of the present invention to reduce complexity of the verification method in particular without increasing complexity of the traffic between the different mobile stations.

Aforesaid problems are solved by a verification method according independent claim 1, computer program product according to the features of independent claim 12 as well as a mobile communication network with the features according to claim 14. Further information can be derived from the subclaims, the figures and the respective description. The features discussed in the subclaims and in particular with respect to the connection method can freely be combined with the features with respect to the computer program product as well as the mobile communication network.

One first aspect of the present invention is focused on a verification method for verification of a Connection Request from a Roaming Mobile Entity requesting connection to a Mobile Network. Such an inventive verification method comprises the following steps:

Receive the Connection Request from the Roaming Mobile Entity at a local Mobile Management Entity Extract at least one Specification Code from the Connection Request for specifying a Network Code of the Roaming Mobile Entity, Identify the Network Code at the Mobile Management Entity as an excluded Network Code, Send the Connection Request from the local Mobile Management Entity to an International Provider Entity, Compare the Network Code of the Roaming Mobile Entity to an Agreement List of International Roaming Agreements at the International Provider Entity, Send an International Connection Answer from the International Provider Entity to the Mobile Management Entity based on the result of the comparing step comprising allowance or denial of the connection to the Mobile Network, Send a Local Connection Answer from the Mobile Management Entity to the Roaming Mobile Entity comprising Allowance or denial of the Connection based on the International Connection Answer.

According to the present invention, it is one key aspect to shift the approval according to the respective agreement situation form the local Mobile Management Entity to the International Provider Entity. To do so, the method according to the present invention carries out only a small part of the steps in the Mobile Management Entity. This part is in particular focused on the identification of a Network Code as an excluded Network Code.

For example a Specification Code according to the present invention can comprise or can be configured to be the IMSI (International Mobile Subscriber Identity), for example as defined on the ITU Technical Recommendation E.212. Such a Specification Code can comprise several different information pieces about the Roaming Mobile Entity or the respective user. In particular, the extraction of the at least one Specification Code specifies the Network Code of the Roaming Mobile Entity. The Network Code gives information about the home provider of the Roaming Mobile Entity. With that information, the Mobile Management Entity does according to the present invention not longer have to carry out a detailed agreement check but only has to check if there is an foreign Network Code or a home Network Code of the respective Mobile Network. If it is a foreign Network Code, it can be defined as an excluded Network Code.

For example, the identification of the Network Code of the Roaming Mobile Entity as an excluded Network Code can be carried out as a comparison to a respective positive or negative list. In particular, the Mobile Management Entity can comprise a list with all information about locally stored home Network Codes. All reconnection requests from Roaming Mobile Entities with unknown Network Codes, namely with Network Codes which are not on that positive list, can be defined as an excluded Network Code according to the present invention. After that minor functionalities has been carried out in the Mobile Management Entity, the further agreement check is passed on to the International Provider Entity.

The difference between a local Mobile Management Entity and the International Provider Entity according to the present invention is in particular focused on the number of the respective stations. While the Mobile Management Entities are spread over the whole country and a spread over the whole local Network, usually only one International Provider Entity is located in a greater region, for example there exists one International Provider Entity for whole Europe, while every single country of Europe comprises multiple Mobile Management Entities, for example 40 up to 400 Mobile Management Entities per country. This leads to the fact that according to the present invention centralization takes place. The respective updating process of a list of agreements can be carried out for that single International Provider Entity, while the complexity of multiple Mobile Management Entities is excluded from that update process. As it can be derived from the information above, Mobile Management Entities do not longer have to have detailed information about international roaming agreements in place. However, these Mobile Management Entities can comprise a positive list, to ensure that only questionable Network Codes, in particular foreign Network Codes are defined as excluded Network Codes which are passed on to the International Provider Entity.

The comparison step, which is carried out in the International Provider Entity can lead to in particular two different answers. The first answer can comprise positive information as to an international roaming agreement which allows the respective connection to the Mobile Network. The second possible answer comprises a denial of the respective Connection Request. These two different information pieces can be configured to be sent with an International Connection Answer (ICA). By receiving that International Connection Answer, the Mobile Management Entity can pass on that International Connection Answer as a Local Connection Answer or create an own Local Connection Answer based on the information comprised by the International Connection Answer.

As it can be derived from aforesaid information, in particular two different communications take place down from the International Provider Entity to the Mobile Entity. It is advantage of the present invention that the different communications between the different stations can be based on existing standards. For example a specific protocol can be in place to assure the communication between the Roaming Mobile Entity and the Mobile Management Entity as well as between the Mobile Management Entity and the International Provider Entity. Due to the fact that at least four different communications take place, all of this communications can be based on those standards. Some of those standards are discussed below:

The idea of this invention in particular remains valid for any other possible 4G Roaming model or architectural diagram as long as the protocols in the interfaces between the MME and the HSS (labelled for example as S6a, and defined on 3GPP TS 29.272) and between the Roaming Mobile Entity and the MME (labelled for example as LTE-Uu 3GPP TS 24.301) remains consistent with the specifications used in the state of the art model.

The International Provider Entity can for example be carried out as a so called DRA or a so called DEA as it will be discussed later on. By shifting the agreement check from the Mobile Management Entity to the International Provider Entity, the traffic is increased a little bit by creating traffic between the Mobile Management Entity and the International Provider Entity. However, the respective set up process for the international roaming agreements has not longer have to take place at all Mobile Management Entity, but only one single International Provider Entity. Thereby, the complexity of the overall system according the present invention is reduced significantly. In particular, the complexity of the concentration of the agreement check to the International Provider is a basis for that advantage.

Of course even further information exchange can take place. For example the connection of International Provider Entity can be passed on to a home network of the Roaming Mobile Entity to carry out further steps or to receive information of the list of international roaming agreements.

According to the present invention it could be of advantage, if an inventive verification method is characterized in that the International Connection Answer and/or the Local Connection Answer is phrased according to a standard communication protocol between the International Provider Entity and the Mobile Management Entity and/or between the Mobile Management Entity and the Mobile Entity. This leads to a further reduction of complexity. Due to the fact that in particular for all communication situations between different elements in the Mobile Network standard protocols are in place, these standard protocols can be used for the present invention. No further complexities are generated by that solution of an inventive method. For example the following standard protocols are used:

The idea of this invention in particular remains valid for any other possible 4G Roaming model or architectural diagram as long as the protocols in the interfaces between the MME and the HSS (labelled for example as S6a, and defined on 3GPP TS 29.272) and between the Roaming Mobile Entity and the MME (labelled for example as LTE-Uu 3GPP TS 24.301) remains consistent with the specifications used in the state of the art model.

By using the respective standards, the present invention can be implemented to Mobile Networks all over the world in particular all over different countries in one region. The implementation has only to be taken in place at the International Provider Entity. In particular, it is of advantage if the Mobile Management Entity uses default action to pass on the Connection Request as it will be discussed later on in more detail.

It is also possible that according to the present invention, the verification method is characterized that the Local Connection Answer comprises a standard error code, in particular error code #15 of the standard protocols which are discussed in more detail later on, in the case of a denial of the connection according to the International Connection Answer. This leads to a further simplification of the inventive verification method. In particular, a standard protocol is used for that error code. A Local Connection Answer can be build up in the Mobile Management Entity as well as in the International Provider Entity. By building up the respective standard error code for the Local Connection Answer in the Mobile Management Entity, it is the result of the receiving of the information of the International Connection Answer. By using error code #15 a further situation takes place in the Mobile Entity. In particular, a blocking functionality is carried out at the Roaming Mobile Entity, which will be discussed later on.

It is also possible, that according to the present invention the verification method is characterized in that the Local Communication Answer comprises at least one piece of information causing the Mobile Entity to block further Connection Requests to the same network. Usually, Mobile Entity awaits a respective answer to the Connection Request. If no answer arrives at the Mobile Entity, time limits apply which are standard programmed in the Roaming Mobile Entity. Due to some standard protocols, if a passing of the Connection Request on to the International Provider Entity, that such International Provider Entity in some cases lacks the sending of an International Connection Answer. In that state of the art situations a multiple try of Connection Requests is carried out by the Roaming Mobile Entity thereby causing complexity and traffic into the network and in particular into the Mobile Management Entity. By causing the Mobile Entity directly to block further Connection requests in particular based on the Local Connection Answer no more time limits have to apply in that case. Only one try to connect to the respective Mobile Network is carried out. After denial that denial information is stored on the Mobile Entity thereby blocking further tries to connect to the same network. In particular that solution of the present invention is combined with the respective standard error code according to the information above.

Further advantage of the present invention can be reached by a verification method characterized in that the step of sending the Connection Request to the International Provider Entity is carried out on the basis of a default action by the Mobile Management Entity. This leads to further simplification of an invention method. Usually a Mobile Management Entity comprises a default action for unknown request. By defining an excluded Network Code has such an unknown request, the default action already placed in the Mobile Management Entity is used for the verification method according to the present invention. This leads to the fact that no different program code is needed for the Mobile Management Entities. In particular, an already existing positive list can be placed at the respective Mobile Management Entity which does not change on the basis of an amendment of International Roaming Agreements. However, the use of the default action uses already existing program codes in the Mobile Management Entity to pass on and to carry out the sending step of the Connection Request from the Mobile Management Entity to the International Provider Entity. This leads to a further reduction of complexity at the Mobile Management Entity.

It is also possible that according to the present invention the verification method is characterized in that it is carried out for high-speed data network, in particular for a 4G network. In particular high-speed data networks comprise the risk of high costs for the respective network provider for the Mobile Entity if no Roaming Agreement is in place. Therefore it has to assure by high security that unknown Network Codes in particular which are not based on an International Roaming Agreement, are denied for connection to this high-speed data network. Therefore, in particular the standard protocols used for the high-speed data network, in particular the 4G network standard protocols are of high advantage as to that solution of the present invention. Of course the general idea of the present invention can also be used for other kind of networks for example the 3G network, the edge network or de GPRS network. Also future possible networks can be configured according to the present invention.

It is further of advantage, if according to the present invention the verification method is characterized in that the at least one Specification Code is extracted from the Connection Request for specifying a Mobile Subscriber of the Mobile Entity, while this extraction is in particular carried out at the International Provider Entity. While the core idea is focused on the so called "agreement check" this particular solution carries out a further functionality and a further check. In particular, a check of the respective user of the Roaming Mobile Entity, namely the Mobile Subscriber can take place. The Specification Code in this case in particular comprises a so called IMSI (International Mobile Subscriber Identity). This user check can for example carried out the HSS (Home Subscriber Server) or can also be carried out directly in the International Provider Entity. More information on that functionality is given below. In particular, also different International Provider Entities can carry out the different functionalities. For example, the Agreement Check can be carried out at a first International Provider Entity, while the user check against the specific contract information of the Mobile Subscriber can be carried out in a further second International Provider Entity.

A verification method according to the aforesaid solution can further be characterized in that the Specification Code specifying the Mobile Subscribers compared to a User List comprising information about the contract details from Mobile Subscribers as to the roaming abilities. While in general the agreement check only gives information if there is an existing roaming agreement, the contract details of the Mobile Subscriber gives information if he is in particular allowed to carry out that roaming connection. There are a lot of situations, where general international roaming agreements are in place between two different network companies, while not all of the users of the respective foreign network company are also able or allowed due to their contract details to connect in that roaming situation. In particular, different parts of the contract, so called contract packs, are necessary to carry out a roaming step or a roaming connection in the respective foreign country. By shifting that contract check or user check from the Home Subscriber Server to the International Provider Entity, a further reduction of complexity is carried out. In particular, traffic to the Home Subscriber Server is reduced. A respective regular update of the list at the International Provider Entity is possible and of advantage.

It is also possible, that according to the present invention the verification method is characterized in that the Connection Request comprises at least the IMSI of the Mobile Entity—But this is only one solution for generating the respective Specification Code. In particular, the IMSI includes the Network Code as well as a user specifying code. The IMSI can be composed of the Mobile Country Code (MCC), the Mobile Network Code (MNC) and the Mobile Subscription Identification Number (MSIN).

It is also possible that according to the present invention, the verification method is characterized in that the functionality of the International Provider Entity use fulfilled by at least one of the following entities:

Diameter Routing Agent DRA

Diameter Edge Agent DEA

Aforesaid list is non-final. Of course the combination of different International Provider Entities is possible according to the present invention.

A further possibility according to the present invention is a verification method which is characterized in that the Network Code is further compared to a Shared Code List, in particular the International Provider Entity, which list comprises information about shared Network Codes in correlation to a national denial information. For example, not all Network Codes can be configured to be based on a respective Agreement List. For that situations code sharing can take place. However, it has to be ensured that national denial information, for example a client of a first country using a shared code for example from a network company of a second country, is ensured that it cannot connect in a roaming situation to a third country. According to the present invention even such complex information of a shared code situation can be implemented into an inventive verification method without problems.

A further aspect of the present invention is a computer program product being stored on a computer readable medium, comprising the following:

Computer readable program means, initiating the computer to receive a Connection Request from a Roaming Mobile Entity at a Local Mobile Management Entity, Computer readable program means, initiating the computer to extract at least one Specification Code from the Connection Request for specifying a Network Code of the Roaming Mobile Entity, Computer readable program means, initiating the computer to identify the Network Code at the Mobile Management Entity as an excluded Network Code, Computer readable program means, initiating the computer to send the Connection Request from the local Mobile Management Entity to an International Provider Entity, Computer readable program means, initiating the computer to compare the Network Code of the Roaming Mobile Entity to an Agreement List of international roaming agreements at the International Provider Entity, Computer readable program means, initiating the computer to send an International Connection Answer from the International Provider Entity to the Mobile Management Entity based on the result of the comparing step comprising allowance or denial of the connection to the Mobile Network, Computer readable program means, initiating the computer to send a Local Connection Answer from the Mobile Management Entity to the Roaming Mobile Entity comprising allowance or denial of the Connection based on the International Connection Answer.

The inventive computer program product is characterized in particular that it comprises computer readable program means, initiating the computer to carry out a method according to an inventive verification method. Thereby, the inventive computer program product leads to the same advantages which have been discussed in detail with respect to the verification method.

A further aspect of the present invention is a Mobile Communication Network for a communication comprising at least one International Provider Entity and multiple local Mobile Management Entities. Such Mobile Communication Network is characterized in that the International Provider Entity and the Mobile Management Entities are configured to carry out an inventive verification method, in particular comprising a computer with a stored inventive computer program product. Thereby, the inventive Mobile Communication Network leads to the same advantages which are discussed in detail with respect to the inventive verification method.

One purpose of the present invention can be described by proposing the following objectives:

Ensure that from an EMM/NAS perspective according to the standard discussed in this application, the call flow of the solution is identical to the mechanisms employed up to date at the MME. This could be one aspect as it does guarantee an optimum user experience and minimizes undesirable signaling overhead.

Export the functionality from a multitude of network elements (the MMEs) located at each individual PMNO (Public Mobile Network Operator) to a central point simpler and more efficient to manage. This is one of the key assets of this invention as it does simplify significantly the entire process of the LTE service footprint roll out delivering:

Efficiencies on resource usage at Mobile network operator

Efficiencies on resource usage at IPE

Shortens the time to market enabling an optimum monetization of Roaming Business for LTE.

The proposed method will follow as described on the next paragraph. The Roaming Mobile Entity will attempt to register and will initiate an Attach Request in form of Connection Request on the EMM/NAS interface. Upon the reception of that message and due to the fact that we are attempting to move the RAT access control to the DEA/DRA (IPE) function, the MME shall be configured to proceed as if the IMSI was always authorized to register. In other words, the IMSI range shall be configured and the MME shall trigger an operation towards the DEA/DRA (IPE).

Upon the reception of that signaling operation, if Roaming shall be allowed, then the IPE shall route the signaling operation to the next hop in the chain till the end point, the HSS. If Roaming shall not be allowed either for that specific subscriber or for any subscriber of that HPMN in that VPMN, the IPE shall react with a new implementation for signaling policing and instead of using a silent discard, it should answer to the AIR (Authentication Information Request) with an AIA (Authentication Information Answer) containing in the response the specific answer:

Error

Experimental result=unknown EPS subscription

Error diagnostic=GPRS subscription provisioned

According to 3GPP TS 29. 272, upon the reception of an AIA containing such error, the MME shall propagate back to the EMM/NAS interface a reject for the initial Attach Request with the reject cause number #15, exactly the same reject cause the MME would have used in the event the IMSI range to which the subscriber belongs would not be provisioned. The mapping between the NAS error codes and the network conditions can be found at 3GPP TS 29. 272 (Table A.2 for the V.12.8.0 of the document on Release 8)

In the event the functionality aiming to be exported to the DEA/DRA is the RAT Access Control of the HSS, the logic and call flow is completely equivalent but it would be done at the DEA/DRA acting on behalf of the HPMN.

BRIEF DESCRIPTION OF THE DRAWINGS

The present invention is discussed in more detail with respect to the accompanying drawings. The drawings show schematically.

DESCRIPTION OF SPECIFIC EMBODIMENTS OF THE INVENTION

Figure 1:
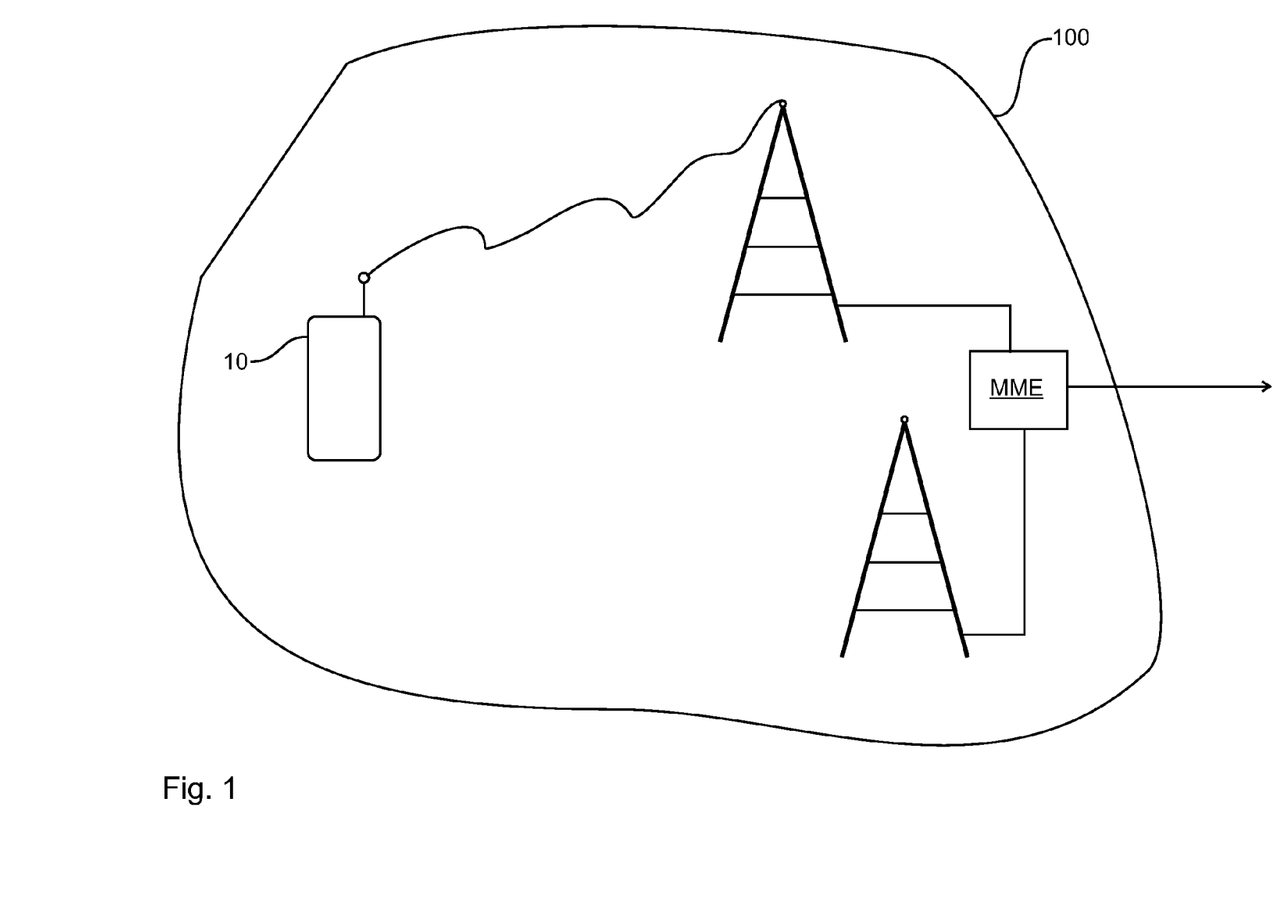
FIG. 1 a first situation of a Roaming Mobile Entity.
Figure 2:
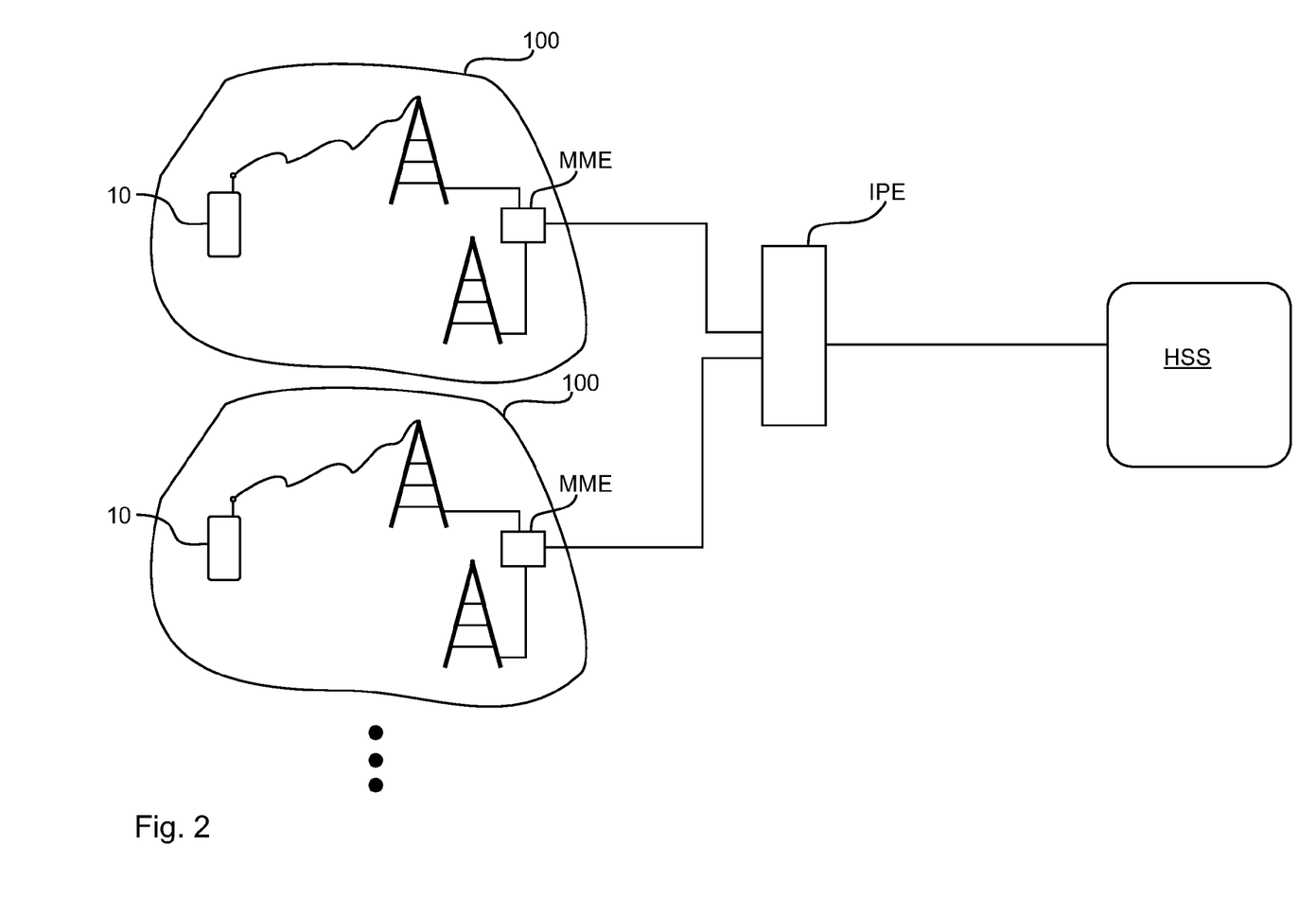
FIG. 2 the situation spread over a whole country of Roaming Mobile Entities, FIG. 3 a first situation of an inventive method, FIG. 4 a further situation of an inventive method, and FIG. 5 a further situation of an inventive method.

FIGS. 1 and 2 disclose a first aspect of the present invention, by defining one possible structure of the Mobile Communication Network 100. That Mobile Network 100 comprising several possibilities for a Mobile Network communication between the Mobile Network 100 and a respective Roaming Mobile Entity 10. The different stations are combined or connected by a Mobile Management Entity MME. Of course spread over a whole country multiple Mobile Management Entities MME are located to connect all of the different parts of the Mobile Network 100 together. One step above the Mobile Management Entities, an International Provider Entity IPE is located for example one IPE for whole Europe. That IPE can for example be connected to a Home Subscriber Server (HSS).

Figure 3:
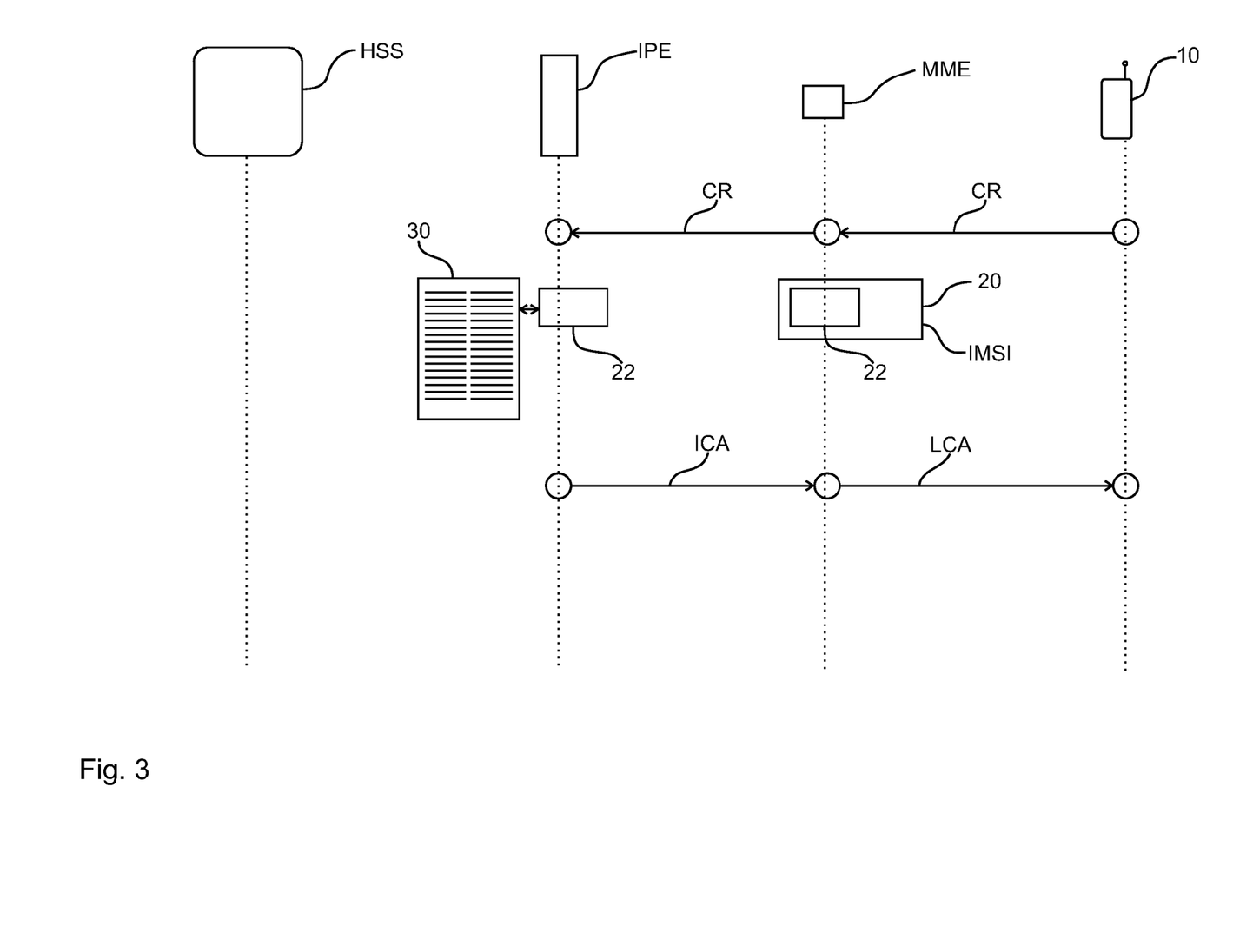
Figure 4:
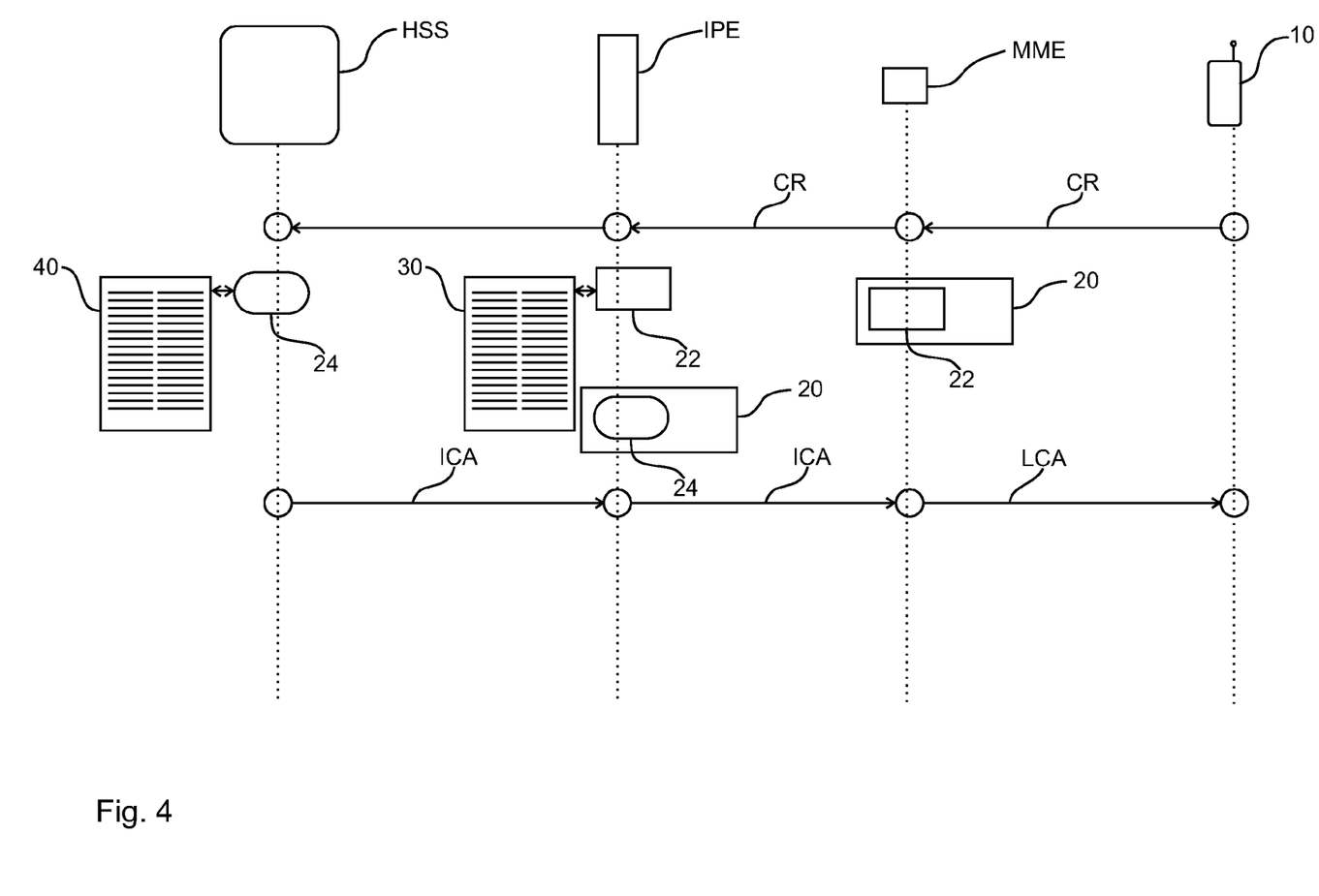
Figure 5:
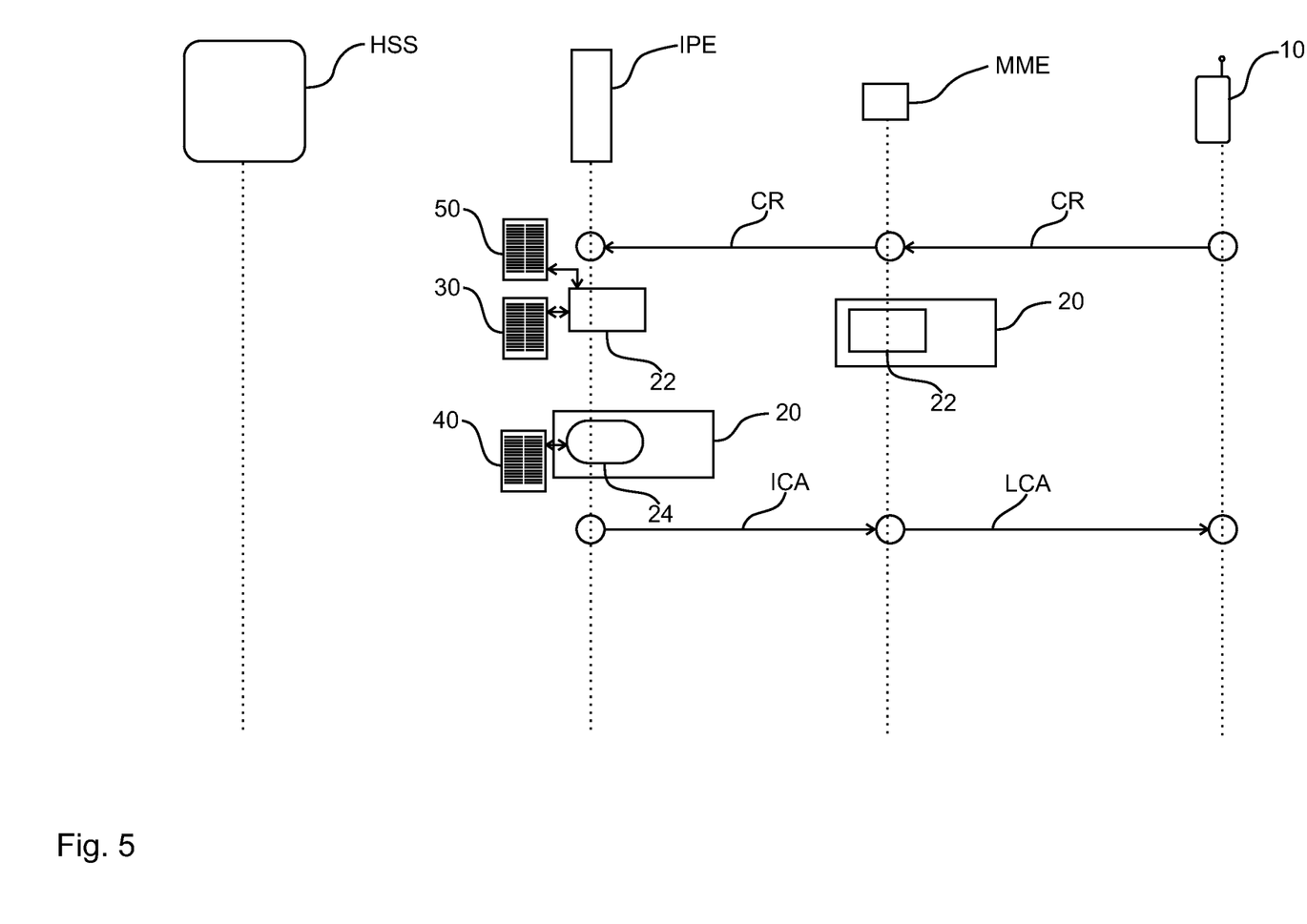

With respect to the different solutions of the present invention, the FIGS. 3 to 5 are now explained in more detail.

For example FIG. 3 discloses first aspect of the present invention. From right to left different parts of the communication and different locations of the connections are shown. At the very right Roaming Mobile Entity 10 is depicted. Coming from right to left, the level in the hierarchy of the whole Mobile Network 100 increases. In that specific solution, the Roaming Mobile Entity 10 sends a Connection Request CR to the MME in particular based on a standard protocol of the communication between the MME and the Mobile Entity 10. In that MME, a Specification Code 20 is extracted as to the Network Code 22. In particular, that Network Code 22 is part of the IMSI (International Mobile Subscriber Identity, see for example ITU Technical Recommendation E.212). After a first general checkup, the MME identifies the Network Code 22 as an excluded Network Code 22, for example by a checkup against positive list. In particular, by using a default action in such default situations, the Connection Request CR after identification of an excluded Network Code 22 is passed on to the IPE. That IPE now carries out the detailed checkup according to the agreement is carried out. In particular, the IPE, an Agreement List 30 is stored. A comparison step is carried out in the IPE by checking if an agreement of international roaming is in place on that Agreement List 30 against the Network Code 22. Based on the answer of that comparison step, an International Connection Answer ICA is created and sent to the MME. The International Connection Answer ICA is configuring to the standard protocol between the IPE and the MME. Based on that information, the MME creates a Local Connection Answer LCA based on the protocol of communication between the MME and the Roaming Mobile Entity 10. Based on that protocol, the Local Connection Answer LCA is based on in particular using standard information. If a denial information is sent to the Roaming Mobile Entity 10, the Local Connection Answer LCA in particular uses this standard error code, for example error code #15 according to standard ITU Technical Recommendation E.212 for causing the Roaming mobile entity to block further connection tries.

FIG. 4 discloses a little bit more complexity according to the present invention. This is in use by a further checkup situation. After the first steps have been carried out according to the situation which has already been discussed in detail with respect to FIG. 3, the IPE passes on at least a part of the Connection Request CR to the Home Subscriber Server HSS. This passing on of information comprises a further part of the Specification Code 20, namely information as to the Mobile Subscriber 24. In the HSS, further checkup is carried out. The information of the Mobile Subscriber 24 is checked against a User List 44 comprising detail contract information as to the Mobile Subscriber 24. This can also be labeled as a user check or a package or contract check. Furthermore, information is created in the HSS from the HSS to the IPE, comprising the answer of the user check. This can overall be added to the International Connection Answer ICA from the IPE to the MME.

The complexity according to FIG. 4 can be also centralized in the IPE. In particular, the agreement check against the Agreement List 30 as well as the user check against the User List 40 can both take place in the IPE according to FIG. 5. Furthermore, according to that solution it is possible to make a further checkup against a Shared Code List 50. This could lead to high complexity situations by less complexity in the functionality. The standard communication between Roaming Mobile Entity 10, the MME and the IPE in both directions is all situations based on the respective standard protocols.

The aforesaid information as description of the detailed solutions of the figures describes the present invention only by the way of details and examples. Of course the different parts of the embodiments can be combined with each other without leaving the scope of the present invention.

REFERENCE SIGNS

10 Roaming Mobile Entity
20 Specification Code
22 Network Code
24 Mobile Subscriber
30 Agreement List
40 User List
50 Shared Code List
100 Mobile Network
CR Connection Request
MME Mobile Management Entity
IPE International Provider Entity
DRA Diameter Routing Agent
DEA Diameter Edge Agent
IPX International Provider Agent
ICA International Connection Answer
LCA Local Connection Answer
HSS Home Subscriber Server
IMSI International Mobile Subscriber Identity

What is claimed is:

1. Verification method for the verification of a Connection Request (CR) from a Roaming Mobile Entity (10) requesting connection to a Mobile Network (100), comprising the following steps:
   Receive the Connection Request (CR) from the Roaming Mobile Entity (10) at a local Mobile Management Entity (MME),
   Extract at least one Specification Code (20) from the Connection Request (CR) for specifying a Network Code (22) of the Roaming Mobile Entity (10),
   Identify the Network Code (22) at the Mobile Management Entity (MME) as a excluded Network Code (22),
   Send the Connection Request (CR) from the local Mobile Management Entity (MME) to an International Provider Entity (IPE),
   Compare the Network Code (22) of the Roaming Mobile Entity (10) to an Agreement List (30) of international roaming agreements at the International Provider Entity (IPE),
   Send an International Connection Answer (ICA) from the International Provider Entity (IPE) to the Mobile Management Entity (MME) based on the result of the comparing step comprising allowance or denial of the connection to the Mobile Network (100),
   Send a Local Connection Answer (LCA) from the Mobile Management Entity (MME) to the Roaming Mobile Entity (10) comprising Allowance or denial of the Connection based on the International Connection Answer (ICA).

2. Verification method according to claim 1, wherein the International Connection Answer (ICA) and/or the Local Connection Answer (LCA) is phrased according to a standard communication protocol between the International Provider Entity (IPE) and the Mobile Management Entity (MME) and/or between the Mobile Management Entity (MME) and the Mobile Entity (10).

3. Verification method according to claim 1, wherein the Local Connection Answer (LCA) comprises a standard error code, in particular error code #15, in the case of a denial of the connection according to the International Connection Answer (ICA).

4. Verification method according to claim 1, wherein the Local Communication Answer (LCA) comprises at least on piece of information causing the Mobile Entity (10) to block further Connection Requests (CR) to the same Network (100).

5. Verification method according to claim 1, wherein the step of sending the Connection Request (CR) to the International Provider Entity (IPE) is carried out on the basis of a default action by the Mobile Management Entity (MME).

6. Verification method according to claim 1, wherein it is carried out for a high speed data Network (100), in particular for a 4G Network (100).

7. Verification method according to claim 1, wherein the at least one Specification Code (20) is extracted from the Connection Request (CR) for specifying a Mobile Subscriber (24) of the Mobile Entity (10), whereby this extraction is in particular carried out at the International Provider Entity (IPE).

8. Verification method according to claim 7, wherein the Specification Code (20) specifying the Mobile Subscriber (24) is compared to a User List (40) comprising information about contract details from Mobile Subscribers (24) as to their Roaming abilities.

9. Verification method according to claim 1, wherein the Connection Request (CR) comprises at least the IMSI of the Mobile Entity (10).

10. Verification method according to claim 1, wherein the functionality of the International Provider Entity (IPE) is fulfilled by at least one of the following entities:
Diameter Routing Agent (DRA)
Diameter Edge Agent (DEA).

11. Verification method according to claim 1, wherein the Network Code (22) is further compared to a Shared Code List (50), in particular at the International Provider Entity (IPE), which list comprises information about shared Network Codes (22) in correlation to national denial information.

12. Computer program product being stored on a non transitory computer readable medium, comprising the following:

Computer readable program means, initiating the computer to receive a Connection Request (CR) from a Roaming Mobile Entity (10) at a Local Mobile Management Entity (MME), Computer readable program means, initiating the computer to extract at least one Specification Code (20) from the Connection Request (CR) for specifying a Network Code (22) of the Roaming Mobile Entity (10), Computer readable program means, initiating the computer to identify the Network Code (22) at the Mobile Management Entity (MME) as an excluded Network Code (22), Computer readable program means, initiating the computer to send the Connection Request (CR) from the local Mobile Management Entity (MME) to an International Provider Entity (IPE), Computer readable program means, initiating the computer to compare the Network Code (22) of the Roaming Mobile Entity (10) to an Agreement List (30) of international roaming agreements at the International Provider Entity (IPE), Computer readable program means, initiating the computer to send an International Connection Answer (ICA) from the International Provider Entity (IPE) to the Mobile Management Entity (MME) based on the result of the comparing step comprising allowance or denial of the connection to the Mobile Network (100), Computer readable program means, initiating the computer to send a Local Connection Answer (LCA) from the Mobile Management Entity (MME) to the Roaming Mobile Entity (10) comprising Allowance or denial of the Connection based on the International Connection Answer (ICA).

13. Computer program product according to claim 12, wherein it comprises computer readable program means, initiating the computer to carry out the Computer readable program means stored in the non transitory computer readable medium.

14. Mobile Communication Network (100) for communication comprising at least one International Provider Entity (IPE) and multiple local Mobile Management Entities (MME), wherein the International Provider Entity (IPE) and the Mobile Management Entities (MME) are configured to carry out a method according to claim 1.

* * * * *